United States Patent Office 3,398,005
Patented Aug. 20, 1968

3,398,005
CEMENT COMPOSITION AND PRODUCTS
THEREOF
Vincent F. Felicetta and Aaron E. Markham, Bellingham, Wash., assignors to Georgia-Pacific Corporation, Portland, Oreg., a corporation of Georgia
No Drawing. Filed Feb. 24, 1965, Ser. No. 435,082
19 Claims. (Cl. 106—90)

ABSTRACT OF THE DISCLOSURE

A portland cement composition containing an admixture of sulfonated lignin reacted with from 0.01 to 45 weight percent, based upon the dry solids of the sulfonated lignin-containing material, of alkylene oxide.

---

This invention pertains to a process for the preparation of a hydraulic cement composition and products thereof. More particularly, it pertains to hydraulic cement and products such as concrete and mortar containing an admixture or additive to impart improved properties.

Different agents are commonly added to hydraulic cement to improve the properties. Additives or admixtures are added to improve the plasticity, increase the strength, entrain air, and to retard the setting as well as to accelerate the setting. Many of the admixtures may impart an improvement to the cement in one particular property but may have an adverse effect upon another property. For example, many plasticizers which are added to reduce the amount of water required may greatly retard the setting. Calcium chloride is widely used as an accelerator in combination with plasticizers to modify their retarding effect on the setting time but the calcium chloride lowers the ultimate strength of the concrete and has a corrosive effect on reinforcing steel under certain conditions, particularly in pre-stressed concrete. An ideal admixture would be one which would have a beneficial effect on one or more particular properties or characteristics of the cement or concrete without an undesirable effect upon other properties. Thus, an admixture or additive which will give a reduction in water requirement and an increase in strength with only a relatively small retardation of setting is very desirable.

It is therefore an object of this invention to provide a cement composition possessing good plasticity without having an appreciably retarded setting time, products made thereof and a process for the preparation of the compositions and products. A further object is to provide a cement composition having good air entrainment properties. A still further object is to provide a cement composition having optimum air entrainment and set retardation properties and high strength.

The above and other objects are attained according to this invention by intermixing as an admixture in the hydraulic cement a reaction product of a sulfonated lignin-containing material and an epoxide having a general formula:

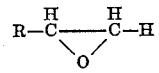

where R represents a hydrogen or an alkyl or haloalkyl radical having from 1 to 6 carbon atoms. The addition of a small amount of the product will decrease the water requirement and increase the strength of concrete or mortar without an appreciable effect on the setting time. Also, the products have improved durability due to increase air entrainment.

The reaction product or admixture may be obtained by interacting the epoxide or a mixture of the epoxides with a sulfonated lignin. The interaction of the epoxide with ligno-sulfonate may be carried out by merely intermixing an aqueous solution of lignosulfonate-containing material with the epoxide under alkaline, neutral or acid conditions with or without the use of catalysts, preferably followed by heating to about 50° C. to 200° C.

The lignosulfonates used in the preparation of the admixture or additive may be obtained by sulfonation of the lignin obtained from any source by the various known methods. One of the main sources of lignosulfonate is the residual pulping liquors of the paper and pulp industries where lignocellulosic materials such as wood, straw, corn stalks, bagasse, and the like are processed to separate the cellulose or pulp from the lignin. In the sulfite pulping process, the lignocellulosic material is digested with a bisulfite or sulfite to obtain a sulfonated residual pulping liquor commonly referred to as "spent sulfite liquor" wherein the sulfonated lignin is dissolved. In other pulping processes, the residual pulping liquor as obtained from the process may not be a sulfonated product. However, the residual liquors or products containing the lignin portion of the lignocellulosic materials from the sulfite or other processes may be treated by the various known methods to sulfonate the lignin to the different degrees desired. For example, the residual liquor obtained in an alkaline process of digestion of lignocellulosic materials such as kraft, soda and other alkali processes may be sulfonated by reacting the product with a bisulfite or sulfite to obtain a sulfonated residual pulping liquor. Likewise, lignins known as "hydrolysis lignin" obtained from the hydrolysis of lignocellulosic materials in manufacturing wood sugars, or "hydrotropic lignins" derived from hydrotropic pulping processes may be sulfonated and used.

The sulfonated lignins obtained by sulfonation of lignin may be salts of certain cations, such as magnesium, calcium, ammonium, sodium, potassium and the like. The lignosulfonates thus obtained may be used as such for the reaction with the epoxide or may be converted to lignosulfonic acid by addition of an acid or by use of ion exchange resins, and used or converted to salts or complexes of metals or other cations other than that obtained in the sulfonation process. Some purification of the sulfonated lignin-containing material is often preferred as this generally reduces the consumption of the epoxide in the reaction.

The lignosulfonate products obtained from the sulfite pulping process or by the sulfonation of other residual pulping liquors or lignin-containing materials usually contain many other constituents besides sulfonated lignin. For example, spent sulfite liquor generally contains about 40 to 60 weight percent of lignosulfonate with the remainder being carbohydrates and other organic and inorganic compounds dissolved in the liquor. The non-lignosulfonate constituents may be removed by the various known methods. For example, carbohydrates may be removed by means such as oxidation, dialysis or fermentation. The removal of some of the constituents, for example, by fermentation of the sugars and recovery of the alcohol thereby produced, may increase the lignosulfonate content in the residual pulping liquor to about 80% of the total solids dissolved in the liquor. Also, heating the pulping liquor under alkaline or acid conditions results in converting certain reactive constituents in the pulping liquor to constituents non-reactive with the epoxide which likewise reduces the epoxide requirement. Further, the acid or alkaline treatment of the pulping liquor may enhance the effectiveness of the admixture prepared from the so-treated pulping liquor. In the alkaline treatment, an alkali metal hydroxide, oxide, or carbonate or an alkaline earth metal hydroxide or oxide may be used. Calcium hydroxide is usually preferred.

While reaction products with up to about 45 weight percent of the epoxide may be used, generally a product reacted with from 1 to 25 weight percent of the epoxide, based upon the dry solids of the sulfonated lignin-containing material, is preferred. An admixture with improved properties is obtained with a content as little as 0.01% of the epoxide. In general, products with from 1 to about 6% epoxide are especially effective for increasing the strength of cement products such as mortar or concrete, while products containing larger proportions of epoxide, 8 to 15%, are especially effective in decreasing the set retardation and increasing the air entrainment. Seldom more than 35 weight percent of the epoxide, based upon the dry solids of the sulfonated lignin-containing material, is employed. The reaction of the sulfonated lignin with the epoxide will generally result in lowering the phenolic hydroxyl content of the sulfonated product. With residual pulping liquors, usually the phenolic hydroxyl content of the liquor is lowered by treatment with the preferred proportion of the epoxide by an amount of 0.2 to 1.2 weight percent units, based on the residual pulping liquor solids, and may be reduced to substantially zero by reaction with larger proportions.

The proportion of the lignosulfonate-epoxide reaction product added to the hydraulic cement may be widely varied, depending on the application or effect desired. Amounts from 0.001 to 2%, based upon the weight of the cement, may be used with an amount in the range of from 0.05 to 0.6% being preferred. In the range of 0.05 to about 0.1%, high water reductions result with little or no effect on the setting time. With 0.1 to 0.3% high water reductions, optimum air entrainment for good durability, high strengths, and mild set retardation are obtained.

The reaction products of this invention may be added to cement during or after its manufacture or to mortar or concrete mixtures. It is generally preferred to intermix the admixture with the cement during manufacturing so that it will not be necessary to do so in the field. The reaction products may be added just prior to the grinding of the cement in which case their surfactant properties function beneficially to improve the grinding, or, on the other hand, the reaction products may be intermixed with the finished cement.

The following examples further illustrate the invention.

All concrete tests were made in accordance with ASTM specifications at a nominal cement factor of 4.75 sacks per cubic yard. Each concrete mix comprised 26.3 lbs. of Type I portland cement, 71 to 81 lbs. of sand, 116 lbs. of coarse aggregate, and sufficient water to give a nominal slump of 3½ inches as measured by a 12-inch cone. The admixture was added as an aqueous solution as part of the mixing water. The coarse aggregate consisted of an equal weight of each of the following size fractions of rounded gravel: ¾ to 1 inch, ½ to ¾ inch, ⅜ to ½ inch and 3/16 to ⅜ inch (pea gravel). The weight of sand used was adjusted within the limits specified to compensate for the differences in amounts of entrained air. Tests made on the fresh concrete were: slump as indicated, air content with the Press-Ur-Meter (manufactured by Concrete Specialties Co., Spokane, Wash.) and time of setting by Proctor penetration resistance needles in compliance with ASTM C–403. Six 6″ x 12″ concrete cylinders were cast from each mix. Three each were used for the 7 day and the 28 day compressive strength tests, which were conducted in accordance with ASTM C-192.

In the results of the concrete tests as listed in the tables in the following examples, actual values for the initial and final times of setting and for the 7 day and 28 day compressive strengths are shown for the plain concrete only. The values on the concrete containing admixtures denote the increase of the time of setting over the plain concrete. The compressive strength is expressed as percentage of plain concrete which was taken to be 100.

EXAMPLE I

To illustrate the advantage gained by using an admixture of the reaction product of a sulfonated lignin-containing material and epoxide, a series of runs was made in which admixtures were prepared by reacting spent sulfite liquor with different proportions of ethylene oxide. A calcium base spent sulfite liquor was used, which was obtained from the pulping of softwoods and was fermented to convert the fermentable sugars to alcohol and the alcohol was removed by distillation. Then to 1800 grams of the fermented spent sulfite liquor solids, as a 49 weight percent solution, 108 grams of calcium hydroxide were added as a slurry in 200 milliliters of water. The mixture was heated and maintained at 90° to 94° C. for about 20 hours. Portions of the alkaline treated spent sulfite liquor were then used for the preparation of the admixtures.

In the preparation of the admixtures of this invention, ethylene oxide was intermixed with the alkaline treated spent sulfite liquor described above and heated in a sealed stainless steel vessel in an oven at about 80° C. for 3¾ hours. The proportion of ethylene oxide used was 2, 6 and 10 weight percent of the spent sulfite liquor solids. The reaction products thus obtained were neutralized to a pH of 7 with sulfuric acid and spray dried after centrifuging to remove the insolubles. The admixtures of runs 8 and 9 had 0.5% phenolic hydroxyl as compared with about 1.6% phenolic hydroxyl before reaction with ethylene oxide.

The admixtures thus prepared were added to samples of concrete from which the test cylinders as described above were made and tested. The results obtained on concrete made with the admixtures (Runs 6 to 9) were compared to results on plain concrete containing no admixture (Run 1). A comparison was also made to the results obtained with an admixture of a fermented alkaline treated spent sulfite liquor (Run 2) of a fermented, alkaline treated spent sulfite liquor which was heated at pH 10 at 80° C. for 3¾ hours (Run 3) of ethylene oxide which was heated at pH 10 at 80° C. for 3¾ hours (Run 4) and of an admixture of a mixture of the above heat-treated spent sulfite liquor and ethylene oxide (Run 5).

The results obtained and pertinent data are shown in the table below.

| Run | Admixture | Admixture Added, percent of Cement | Cement Factor, sks./cu. yd. | Slump, in. | Water Redn., percent | Air Content, percent by vol. | Increase in Time of Setting, hrs./min. | | Compressive Strength (percent of plain concrete) | |
|---|---|---|---|---|---|---|---|---|---|---|
| | | | | | | | Initial Set | Final Set | At 7 days | At 28 days |
| 1 | None (plain concrete) | None | 4.78 | 3¼ | | 2.3 | 0/00 (4/50) | 0/00 (6/50) | 100 (2,280) | 100 (3,550) |
| 2 | Sulfite liquor | 0.3 | 4.75 | 3½ | 17 | 4.7 | 2/50 | 2/55 | 131 | 120 |
| 3 | Sulfite liquor heated at 80° C. for 3¾ hrs | 0.27 | 4.72 | 4 | 12 | 4.4 | 3/15 | 3/10 | 115 | 116 |
| 4 | Ethylene oxide heated at 80° C. for 3¾ hrs | 0.027 | 4.79 | 3¼ | 3 | 2.5 | 0/40 | 0/40 | 93 | 105 |
| 5 | Mixture-liquor of Run 3 and Ethylene oxide of Run 4 above | 0.27 / 0.027 | 4.74 | 3½ | 15 | 4.8 | 3/20 | 3/25 | 118 | 113 |
| 6 | Sulfite liquor 2% ethylene oxide | 0.3 | 4.74 | 3¾ | 18 | 5.7 | 2/20 | 2/00 | 139 | 121 |
| 7 | Sulfite liquor 6% ethylene oxide | 0.3 | 4.75 | 3 | 20 | 6.1 | 2/00 | 2/00 | 130 | 112 |
| 8 | Sulfite liquor 10% ethylene oxide | 0.2 | 4.75 | 3 | 17 | 5.3 | 0/20 | 0/10 | 132 | 122 |
| 9 | do | 0.3 | 4.78 | 3¼ | 29 | 7.4 | 1/00 | 0/40 | 135 | 113 |

EXAMPLE II

Admixtures were prepared in a manner similar to that described above except that propylene oxide, butylene oxide, and epichlorohydrin were interacted with the spent sulfite liquor instead of ethylene oxide. The results obtained are shown in the table below.

| Run | Admixture | Admixture Added, percent of Cement | Cement Factor, sks./cu. yd. | Slump, in. | Water Redn., percent | Air Content, percent by vol. | Increase in Time of Setting, hrs./min. | | Compressive Strength (percent of plain concrete) | |
|---|---|---|---|---|---|---|---|---|---|---|
| | | | | | | | Initial Set | Final Set | At 7 days | At 28 days |
| 1 | None (plain concrete) | 0 | 4.77 | 3½ | | 2.5 | 0/00 (4/50) | 0/00 (7/00) | 100 (2,210) | 100 (3,460) |
| 2 | Sulfite liquor | 0.3 | 4.75 | 3½ | 17 | 4.7 | 2/50 | 2/55 | 131 | 120 |
| 3 | Sulfite liquor, 13.2% propylene oxide | 0.3 | 4.64 | 4½ | 29 | 10.8 | 1/30 | 0/55 | 109 | 93 |
| 4 | Sulfite liquor, 5% butylene oxide | 0.3 | 4.74 | 3¼ | 27 | 7.8 | 2/30 | 2/05 | 130 | 111 |
| 5 | Sulfite liquor, 10% epichlorohydrin | 0.3 | 4.74 | 3 | 17 | 5.5 | 1/40 | 1/30 | 129 | 125 |

What is claimed is:

1. A cement composition comprising a portland cement and from 0.001 to 2 weight percent, based upon the weight of the cement, of the reaction product of a sulfonated lignin-containing material with from 0.01 to 45 weight percent, based upon the dry solids of the sulfonated lignin-containing material, of an exoxide having a general formula:

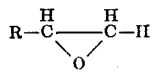

wherein R represents a member of the group consisting of hydrogen and alkyl and haloalkyl radicals having from 1 to 6 carbon atoms.

2. A composition according to claim 1 wherein the sulfonated lignin-containing material is a sulfonated residual pulping liquor.
3. A composition according to claim 2 wherein the epoxide is ethylene oxide.
4. A composition according to claim 2 wherein the epoxide is propylene oxide.
5. A composition according to claim 2 wherein the epoxide is butylene oxide.
6. A composition according to claim 2 wherein the epoxide is epichlorohydrin.
7. A composition according to claim 1 wherein the sulfonated lignin-containing material is a spent sulfite liquor.
8. A composition according to claim 7 wherein the epoxide is recated with the spent sulfite liquor until the phenolic hydroxyl content of the spent sulfite liquor is lowered by at least 0.2 weight percent, based upon the spent sulfite liquor solids.
9. A composition according to claim 7 wherein the reaction product is a spent sulfite liquor reacted with from 1 to 25 weight percent of the epoxide, based upon the spent sulfite liquor solids, and is present in an amount in the range of from 0.05 to 0.6 weight percent, based upon the weight of the portland cement.
10. A composition according to claim 9 wherein the epoxide is ethylene oxide.
11. A composition according to claim 9 wherein the epoxide is propylene oxide.
12. A process for the preparation of concrete and mortar using portland cement, which comprises intermixing the portland cement with water, aggregate and an admixture in an amount of from 0.001 to 2 weight percent, based upon the weight of the cement, and placing the resulting mixture in a form until the mixture has set into a monolithic body, said admixture being the reaction product of sulfonated lignin-containing material with from 0.01 to 45 weight percent, based upon the dry solids of the sulfonated lignin-containing material, of an epoxide having a general formula:

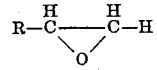

wherein R represents a member of the group consisting of hydrogen and alkyl and haloalkyl radicals having from 1 to 6 carbon atoms.

13. A process according to claim 12 wherein the admixture is the reaction product of spent sulfite liquor with the epoxide.
14. A process according to claim 13 wherein the spent sulfite liquor is reacted with from 1 to 25 weight percent of the epoxide.
15. A concrete composition which comprises a portland cement, water, aggregate, and from .001 to 2 weight percent of an admixture, based upon the weight of the portland cement, said admixture being the reaction product of sulfonated lignin-containing material with from 0.01 to 45 weight percent, based upon the dry solids of the sulfonated lignin-containing material, of an epoxide having a general formula:

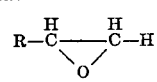

wherein R represents a member of the group consisting of hydrogen, and alkyl and haloalkyl radicals having from 1 to 6 carbon atoms.

16. A composition according to claim 15 wherein the admixture is the reaction product of a spent sulfite liquor with the epoxide.
17. A composition according to claim 16 wherein the spent sulfite liquor is reacted with from 1 to 25 weight percent of the epoxide.
18. A composition according to claim 17 wherein the epoxide is ethylene oxide.
19. A composition according to claim 17 wherein the epoxide is propylene oxide.

References Cited

UNITED STATES PATENTS

| | | | |
|---|---|---|---|
| 2,854,444 | 9/1958 | Monson et al. | 106—90 |
| 3,008,843 | 11/1961 | Jolly | 106—90 |
| 3,090,692 | 5/1963 | Kelly et al. | 106—92 |
| 3,232,777 | 2/1966 | Bush | 106—90 |
| 3,240,736 | 3/1966 | Beckwith | 106—90 |
| 3,307,588 | 3/1967 | Hylak | 106—97 |

TOBIAS E. LEVOW, Primary Examiner.

SAMUEL E. MOTT, Assistant Examiner.